US006540182B1

(12) United States Patent
Wilfer

(10) Patent No.: US 6,540,182 B1
(45) Date of Patent: Apr. 1, 2003

(54) STAND FOR MUSICAL INSTRUMENTS

(76) Inventor: Hans-Peter Wilfer, Zum Hackerhof 5, D-08258 Markneukirchen (DE)

( * ) Notice: Subject to any disclaimer, the term of this patent is extended or adjusted under 35 U.S.C. 154(b) by 60 days.

(21) Appl. No.: 09/687,814

(22) Filed: Oct. 13, 2000

(30) Foreign Application Priority Data

Aug. 30, 2000 (EP) ............................................ 00118805

(51) Int. Cl.[7] .................................................. F16L 3/00

(52) U.S. Cl. ........................ 248/121; 84/327; 211/85.6; 248/150

(58) Field of Search ................................ 248/121, 150, 248/166, 443, 483; 84/327; 211/85.6, 124

(56) References Cited

U.S. PATENT DOCUMENTS

| | | | | | |
|---|---|---|---|---|---|
| 1,774,096 | A | | 8/1930 | Hasterok | |
| 2,591,805 | A | * | 4/1952 | Gossett | 211/124 X |
| 5,664,756 | A | * | 9/1997 | Liao | 248/443 |
| 5,852,250 | A | * | 12/1998 | Cha | 84/327 |
| 5,959,225 | A | | 9/1999 | Hsu | 84/327 |
| 6,179,135 | B1 | * | 1/2001 | Simpson | 211/85.6 |
| 6,269,213 | B1 | * | 10/2001 | Law, III et al. | 248/461 |

FOREIGN PATENT DOCUMENTS

| | | |
|---|---|---|
| DE | 9005937 | 9/1990 |
| DE | 9504830 | 9/1995 |

* cited by examiner

*Primary Examiner*—Ramon O. Ramirez
(74) *Attorney, Agent, or Firm*—Sidley Austin Brown & Wood, LLP

(57) ABSTRACT

A stand for musical instruments having a body and a neck, the stand including a pedestal, two elongate spaced support members provided on the pedestal and extending parallel to each other for supporting the body of musical instrument, and a bearing member arranged on the pedestal and extending parallel to the support members for supporting the neck of the musical instrument.

1 Claim, 4 Drawing Sheets

STAND FOR MUSICAL INSTRUMENTS

BACKGROUND OF THE INVENTION

1. Field of the Invention

The present invention relates to a stand for musical instruments, in particular for guitars and bass-guitars, having a body and a neck with the stand including a pedestal, two elongate, spaced support members provided on the pedestal and extending parallel to each other for supporting the body of the musical instrument, and a bearing member arranged on the pedestal and having a support surface for supporting the neck of the musical instrument.

2. Description of the Prior Art

Stands for musical instruments, in particular guitars or bass-guitars, are generally available on the market. In the conventional stands, the support members, which extend parallel to each other extend mainly transverse to an effective support surface of the bearing member that supports the neck of a musical instrument. Such stands in many cases are impractical. Multiple stands of this type are costly and require a large space for accommodating a plurality of musical instruments. Also, placing the musical instruments in a stand requires, with conventional models, precision and concentration which are not always available in a hectic atmosphere of a stage.

Accordingly, an object of the present invention is to provide a stand for musical instruments, in particular guitars and bass-guitars, which has a simple construction.

Another object of the present invention is to provide an easily handable stand for musical instruments.

SUMMARY OF THE INVENTION

These and other objects of the present invention, which will become apparent hereinafter, are achieved by providing a bearing member extending parallel to the support members. The basic idea of the present invention consists in arranging the bearing member in such a manner that it extends, together with its support surface, parallel to the bearing members. A guitar or a bass-guitar is then so positioned on the support member that its main plane extends transverse to the support members and to the support surface of the bearing member. The guitar or bass-guitar is placed on the stand and is removed from the stand substantially in the direction of its main plane. Simultaneously, the guitar of bass-guitar can pivot about an axis extending transverse to its main plane. In conventional stands, the instrument pivots about an axis lying in its main plane.

These and other objects of the present invention, which will become apparent hereinafter, are achieved by providing a bearing member extending parallel to the support members. The basic idea of the present invention consists in arranging the bearing member in such a manner that it extends, together with its support surface, parallel to the support members. A guitar or a bass-guitar is then so positioned on the support member that its main plane extends transverse to the support members and to the support surface of the bearing member. The guitar or bass-guitar is placed on the stand and is removed from the stand substantially in the direction of its main plane. Simultaneously, the guitar or bass-guitar can pivot about an axis extending transverse to its main plane. In conventional stands, the instrument pivots about an axis laying in its main plain.

According to a particularly preferred embodiment of the present invention, the projection of the support surface or line of the bearing member lies outside of the support members. When the stand is so arranged that the plane of the support members extends substantially horizontally, it is then assured a certain inclination of the musical instrument to a vertical, with the instrument "leaning" on the bearing member, with the gravity force insuring a stable position of the instrument. With a guitar or bass-guitar, its inclination permits to achieve a particularly aesthetic effect.

In accordance with a further preferred embodiment of the present invention, the support members are connected at their opposite ends with respective side section. As a result, a closed form of the support for the instrument body is obtained. The side sections somewhat protect the instrument, shielding the stand.

According to further development of the present invention, the support members are so spaced from each other that the musical instrument is placed on the support members not only from above but also is somewhat immersed in a region between the support elements, which further stabilizes the musical instrument. The support members are spaced from each other, in case the supported musical instrument is a guitar or bass-guitar, by from 8 to 40 cm, preferably by from about 20 cm to about 30 cm.

In accordance with another preferred embodiment of the present invention, hinge elements are provided on the pedestal in the region of the support members for enabling a pivotal movement of at least the remote from the bearing member, support member relative to the bearing member about an axis extending parallel to the support members. This permits to reduce the transportation volume of the stand. Simultaneously, this permits to reduce manufacturing and installation costs.

According to a still further embodiment of the present invention, the bearing member has a plurality of separating elements for dividing the bearing member in a plurality of section. This makes the spacing between the instruments clearly visible. In one of the embodiments, the pedestal comprises a support frame, which is inclined to a vertical in a mounted position of the stand, with the bearing member engaging the support frame, on one hand and with foot members or wall attachment elements being provided on the support frame, on the other hand. The stand for musical instruments, in principle, is designed for being placed on a floor. However, it can be modified for an attachment to a wall. In this case, care should be taken to insure that the guitars or bass-guitars are spaced from the wall.

In particularly advantageous, stable and easily manufactured embodiment of the present invention, the pedestal, and/or support members, and/or bearing members are formed of circular tubes.

For protection of a musical instrument and/or for better securing the instrument from sidewise displacement, the bearing member and/or support members is (are) covered, at least partially, with a plastic sheathing from a foamed material having a comparatively high friction coefficient. The sidewise displacement can be prevented or at least limited with separating elements.

According to a further development of the present invention, the support members function as struts for reinforcing the pedestal. Thus, the support members perform a double function. On one hand, they support the body of a musical instrument(s) and, on the other hand, they reinforce the pedestal.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

RETAILED DESCRIPTION OF THE PREFERRED EMBODIMENTS

Figure 1:
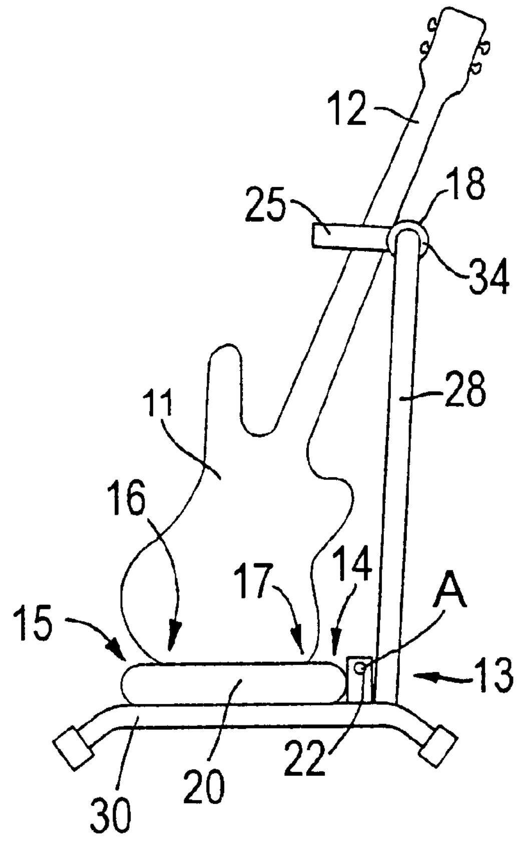
FIG. 1 a side view of a stand for musical instruments according to the present invention with a bass-guitar supported thereon.

A stand for musical instruments according to the present invention, which is shown in FIG. 1, is formed as a frame-like pedestal 13 having foot members 29, 30 and a substantially U-shaped support frame 28. The U-shaped support frame 28 is connected with the foot members 29, 30 by appropriate hinge elements 22, 22.

Two elongate support members 14, 15 and two side sections 19, 20 form together a substantially rectangular hoop 36 with rounded comers. The hoop 36 is connected, in the region of its side section 19, 20 with the foot members 29–30 preferably by screws. This increases the stability of the pedestal 13 over the elongate support members 14, 15. The elongate support members 14, 15 perform, in this case, a double function, namely, on one hand, they serve for supporting the musical instrument and, on the other hand, they serve as struts for the frame-like pedestal 13.

For the protection of the musical instrument and in order to increase friction with the musical instrument to prevent its off-center displacement, the hoop 36 is sheathed with a formed plastic material SUPERCON®.

One or more bass-guitars, each of which has a body 11 and a neck 12, can be inserted in the hoop 36 with their main planes extending transverse to the support members 14, 15, as shown in FIG. 1. In the embodiment shown in FIG. 1, arbitrary selected bearing points 16, 17 provide for placement of the body 11 of the bass-guitar on the support members 14, 15. The placement and removal of the bass-guitar (or any other similar instrument) is effected essentially in the same direction, which coincides with the main plane of the bass-guitar, with, if necessary, pivoting the bass-guitar about its rotational axis that extends perpendicular to the main plain.

In the region of the support frame remote from the foot members, in the embodiment shown in FIGS. 1–5, a bearing member 18 is formed on the middle leg of the U-shaped support frame, which extends parallel to the support members 14, 15 and defines a bearing surface or bearing line which serves as an upper support for the supported musical instrument. In the shown embodiment, the bass-guitar leans on the bearing member 18 in the region of its neck. Separating elements 23, 24, 25 can further be provided on the elongate bearing member 18. The separating elements 23, 24, 25 extend substantially transverse to the support plan of the bearing member and define a multi-stand for a plurality of musical instruments. Simultaneously, as in the discussed embodiment, the separating elements can serve for the stabilization of the bass-guitar.

Figure 2:
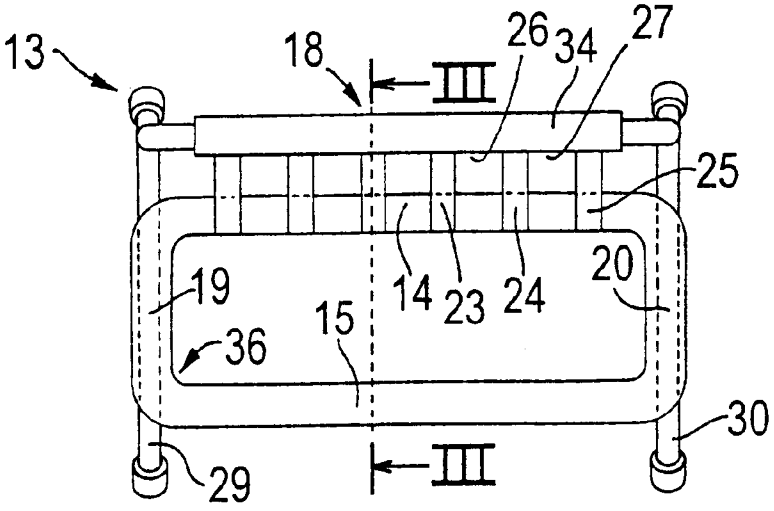
FIG. 2 a plan view of the stand shown in FIG. 1, without the bass-guitar.

As can be seen in FIG. 2, the hoop 36, which is formed of the elongate support elements 14, 15 and side sections 19, 20, serves as common support for several musical instruments. Simultaneously, the hoop 36 serves as a strut element for the pedestal 13. Advantageously, the bearing member 18, together with the separating elements 23, 24, 25 can be sheathed. Between the separating elements 23, 24, 25, there are provided bottom sections 26, 27 permitting insertion respective musical instruments. Dependent on the shape of a musical instrument, a plurality of musical instruments can be inserted into a bottom section 26, 27. However, this increases the danger of a musical instrument being damaged upon its insertion in and withdrawal from the stand.

Figure 3:
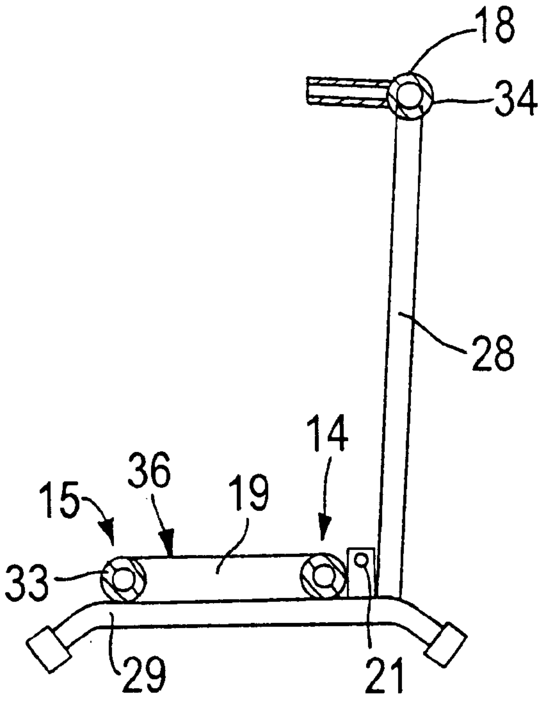
FIG. 3 a cross-sectional view of the stand shown in FIGS. 1–2 along line III—III in FIG. 2.

The bearing member 18 and the separating elements 23, 24, 25 form side limits of bottom sections 26, 27 and prevent a placed musical instrument from being toppled over. The separating elements 23, 24, 25 are provided with plastic sheathings for protecting a musical instrument and for increasing the holding force. The hoop 36, which is represented in FIG. 3 by a left side section 19 is formed, as the frame-like pedestal 13, of tubes, preferably metal tubes. The metal tubes are sheathed, as it has already been mentioned above, with plastic sheathings 33. In the region of the bearing member 18, the U-shaped support frame 28 is sheathed with a plastic sheathing 34 at its inner end.

For pivoting the support frame 28 relative to the foot members 29, 30, together with the hoop 36 secured thereto, there are provided, as it has already been discussed above, hinge elements 21, 22. The hinge elements 21, 22 each includes a flange with a core which is secured to one half of the foot members 29, 30. An associated flange is provided on a distal end of the U-shaped support frame 28. This flange has likewise a corresponding core. The cores of all four flanges are aligned with each other and are pivotally connected, pairwise, with a screw bolt. The screw bolt defines a pivot axis A about which the support flame 28 pivots relative to the foot members 29, 30.

Figure 4:
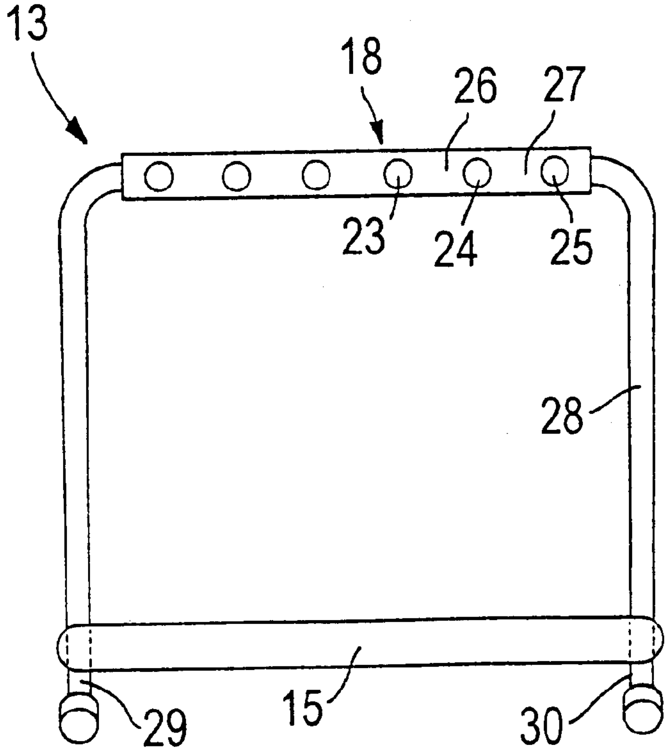
FIG. 4 a front view of the stand shown in FIG. 1.

The U-shaped form of the support frame 28 can clearly be seen in FIG. 4.

Figure 5:
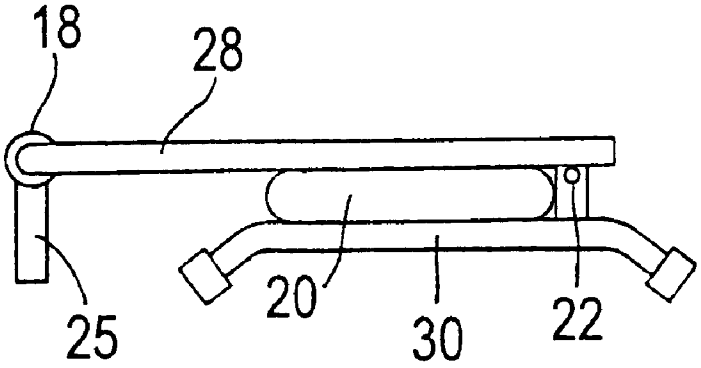
FIG. 5 a side view of the stand shown in FIG. 1 in the folded condition.

FIG. 5 shows the stand in its folded position. In the folded position, the hoop 36 forms a support for the support frame 28. In this position, the distal end of the support frame 28 forms a stop engaging the foot members 29, 30. The geometry of the support frame 28 is so selected that an outer leg of the support frame 28 forms, in the folded position, with the plane of the hoop 36 an angle of more than 90°, preferably, from 90° to 96°.

Figure 6:
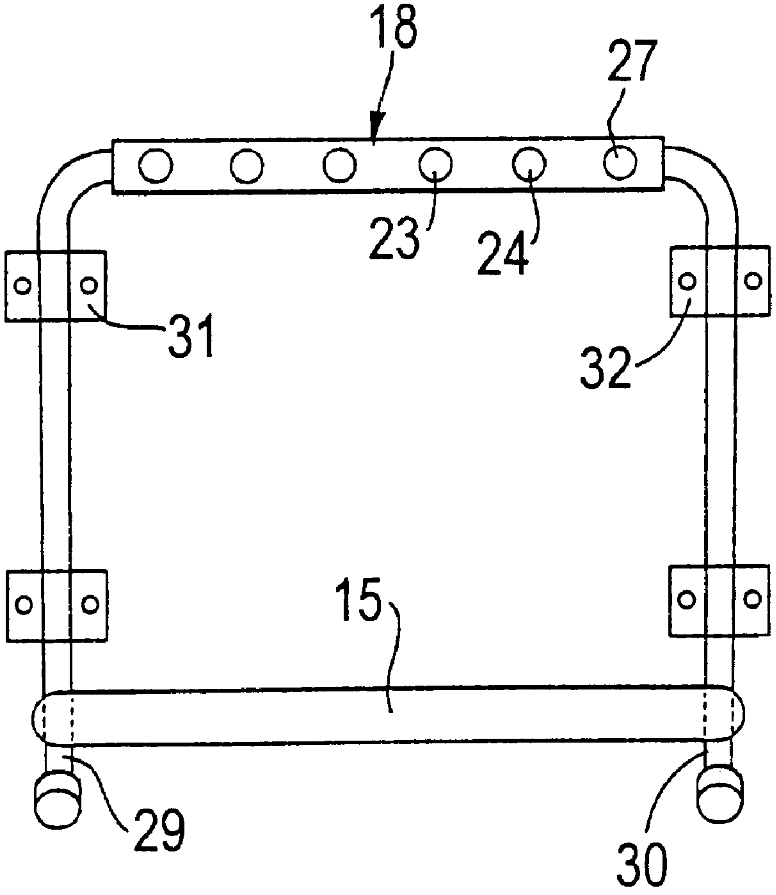
FIG. 6 a plan view of another embodiment of a stand for musical instruments according to the present invention.

FIG. 6 shows an alternative embodiment of the inventive stand with the stand being adapted for being secured to a wall. To this end, the support frame 28 can be provided with attachment elements 31, 32 which enable the attachment of a stand to a wall. However, a certain distance of the stand from the wall should be insured. To this end, the stand is secured with its attachment elements 31, 32 to preferably, an end surface of a shelf or the like.

Figure 7:
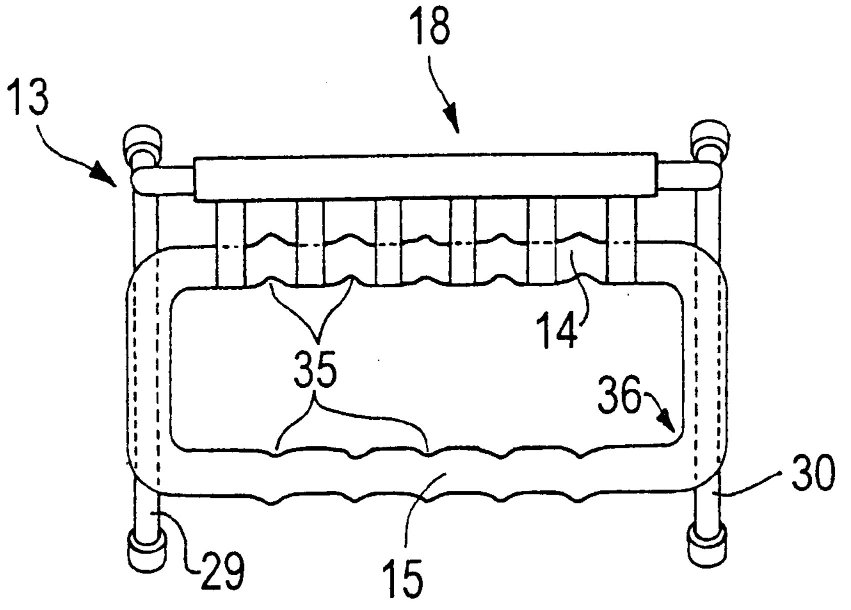
FIG. 7 a plan view of yet another embodiment of a stand for musical instrument according to the present invention.

In other alternative embodiment of the inventive stand is shown in FIG. 7. In this embodiment, the elongate support member 14, 15 somewhat deviate from an exactly parallel extension as a result of provision thereon of outwardly directed indentations 35. The indentation 35, which are formed in the hoop 36, additionally secure a bass-guitar of the like in a predetermined position, preventing an inadvertent change of the relative positions of a plurality of guitars supported in the stand.

Figure 8:
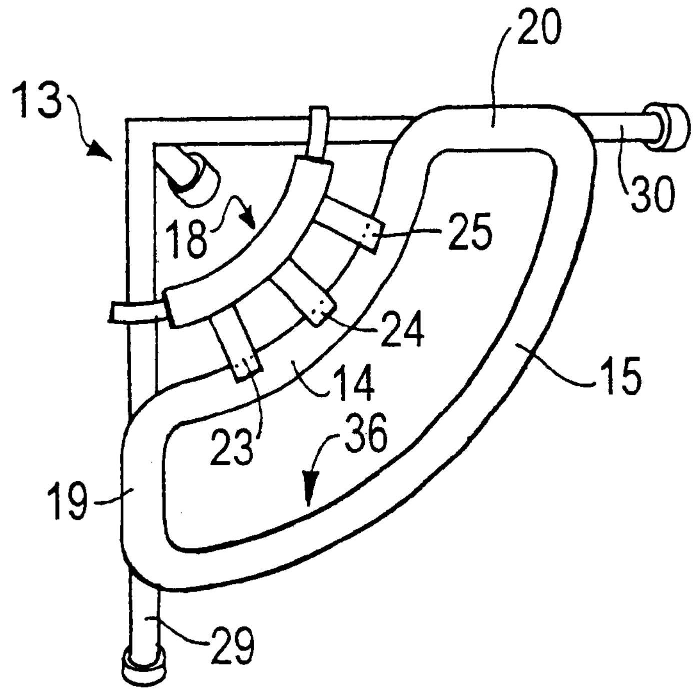
FIG. 8 a plan view of a further embodiment of a stand for musical instruments according to the present invention.

As shown in FIG. 8, the support members 14, 15 need not be linear. The support members 14, 15 can be formed, as shown in FIG. 8, as arcuate members, e.g., as sections of a circle. The support members 14, 15, which are shown in FIG. 8, have an angular extent corresponding approximately to a quarter of a circle, i.e., of approximately 90°. Such a stand is designed for being placed in a comer of a room. The stand also can be made completely circular and can include a plurality of adjoining hoop sections or be formed of a continuous hoop, with the support elements being formed as annual members, without side sections.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within spirit and scope of the present invention as defined by the appended claims.

What is claimed is:

1. A stand for musical instruments having a body and a neck, comprising a frame-like pedestal; two elongate support members provided on the pedestal and extending parallel to each other in a spaced relationship to each other, the elongate support members forming a base for supporting the body of a musical instrument in a position in which a main plane of the musical instrument extends transverse to a longitudinal extent of the support members; and a bearing member arranged on the pedestal for supporting the neck of the musical instrument and having a neck-supporting surface thereof extending parallel to the support members, wherein the pedestal comprises a support frame, which is inclined to a vertical in a mounted position of the stand, wherein the bearing member engages the support frame, and wherein the stand further comprises one of foot members and wall attachment elements provided on the support frame.

* * * * *